(12) United States Patent
Wang

(10) Patent No.: US 9,357,027 B2
(45) Date of Patent: May 31, 2016

(54) DATA PROCESSING METHOD AND SYSTEM

(71) Applicant: TENCENT TECHNOLOGY (SHENZHEN) COMPANY LIMITED, Shenzhen, Guangdong (CN)

(72) Inventor: Hui Wang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

(21) Appl. No.: 14/439,580

(22) PCT Filed: Oct. 28, 2013

(86) PCT No.: PCT/CN2013/086090
§ 371 (c)(1),
(2) Date: Apr. 29, 2015

(87) PCT Pub. No.: WO2014/067437
PCT Pub. Date: May 8, 2014

(65) Prior Publication Data
US 2015/0296036 A1 Oct. 15, 2015

(30) Foreign Application Priority Data
Oct. 29, 2012 (CN) .......................... 2012 1 0420674

(51) Int. Cl.
G06F 17/30 (2006.01)
H04L 29/08 (2006.01)
H04L 29/06 (2006.01)

(52) U.S. Cl.
CPC ............ *H04L 67/26* (2013.01); *G06F 17/3048* (2013.01); *H04L 67/10* (2013.01); *H04L 67/42* (2013.01)

(58) Field of Classification Search
CPC ... G06Q 50/01; G06Q 30/0255; G06Q 30/02; G06Q 30/0224; G06Q 30/0242; G06Q 30/0251; G06Q 30/0256; G06Q 30/0264; G06Q 30/0269; G06Q 30/0273; G06F 17/30867; G06F 17/30899; H04L 51/32; H04L 12/05
See application file for complete search history.

(56) References Cited

U.S. PATENT DOCUMENTS

| | | | |
|---|---|---|---|
| 9,171,326 B2 * | 10/2015 | Pavlidis | G06Q 50/01 |
| 2005/0143966 A1 * | 6/2005 | McGaughy | G06F 17/5036 703/3 |
| 2005/0256866 A1 * | 11/2005 | Lu | G06F 17/30867 |
| 2007/0156636 A1 * | 7/2007 | Norton | G06F 17/30997 |
| 2008/0005064 A1 * | 1/2008 | Sarukkai | G06F 17/241 |
| 2008/0215426 A1 * | 9/2008 | Guldimann | G06Q 30/02 705/14.61 |
| 2011/0018695 A1 * | 1/2011 | Bells | G06F 3/016 340/407.2 |
| 2012/0131171 A1 * | 5/2012 | Samuel | G06Q 50/01 709/224 |
| 2013/0035982 A1 * | 2/2013 | Zhang | G06Q 30/02 705/7.29 |
| 2013/0211944 A1 * | 8/2013 | Momin | G06Q 30/02 705/26.2 |
| 2013/0263161 A1 * | 10/2013 | Challa | G06F 9/5011 719/328 |

FOREIGN PATENT DOCUMENTS

| | | |
|---|---|---|
| CN | 101030218 A | 9/2007 |
| CN | 102650931 A | 8/2012 |
| WO | 2012085921 A1 | 6/2012 |

OTHER PUBLICATIONS

International Search Report and Written Opinion of the International Searching Authority for PCT/CN2013/086090 (in English and Chinese), mailed Feb. 20, 2014; ISA/CN.

* cited by examiner

*Primary Examiner* — Sargon Nano
(74) *Attorney, Agent, or Firm* — Harness, Dickey & Pierce, P.L.C.

(57) ABSTRACT

A data processing system relates to network communications technologies. A data buffering layer receives an operation request of a follower of a user having a long relation and of a client. The data buffer layer pushes the operation request to a service layer. The service layer receives the operation request pushed by the data buffering layer and caches the operation request according to a minimum storage unit. The minimum storage unit is determined by using the user having a long relation chain as a unit. The service layer determines a specified database that belongs to the user having a long relation chain and performs an operation on the specified database according to the operation request. The service layer determines the specified database according to a preset routing configuration when data cached in the minimum storage unit reaches a preset condition.

9 Claims, 4 Drawing Sheets

DATA PROCESSING METHOD AND SYSTEM

CROSS-REFERENCE TO RELATED APPLICATIONS

This application is a U.S. National Phase Application under 35 U.S.C. 371 of International Application No. PCT/CN2013/086090 filed on Oct. 28, 2013 and published in Chinese as WO 2014/067437 on May 8, 2014. This application claims priority to Chinese Patent Application No. 201210420674.8, filed with the Chinese Patent Office on Oct. 29, 2012 and entitled "DATA PROCESSING METHOD AND SYSTEM". The entire disclosures of the above applications are incorporated herein by reference in their entirety.

FIELD OF THE TECHNOLOGY

The present disclosure relates to the field of network communications technologies, and in particular, to a data processing method and system.

BACKGROUND OF THE DISCLOSURE

With the rise of micro-blog, increasingly more network users become micro-blog users, and there are even a group of users having a long relation chain. A user having a long relation chain refers to a user whose follower number exceeds a certain number, such as a star authenticated user. Because the user having a long relation chain has too many followers and the volume of generated data is huge, how a server improves a speed of responding to a huge number of requests and completes a service as soon as possible is a basic problem that needs to be solved.

In the existing technology, a data buffering layer receives an operation request of a follower of a user, having a long relation chain, of a client, where the operation request includes a follower adding request, a follower modifying request, a follower deleting request, or the like; then, the data buffering layer synchronizes the received operation request to a stream module; after receiving the operation request sent by the data buffering layer, the stream module stores in hours each operation request to a database corresponding to the operation request, and the database completely stores entire follower information of one user having a long relation chain; then, the stream module actively pushes the operation request in each database to a friend module at regular intervals; and after receiving the operation request pushed by the stream module, the friend module performs an operation on follower information in a database corresponding to the user having a long relation chain according to the operation request.

In a process of implementing the present disclosure, the inventor finds that the existing technology at least has the following problems:

Because one database not only stores an operation request, but also stores entire follower information of a user having a long relation chain, data operation actions of the stream module and the friend module are too slow; as a result, a processing speed of the data buffering layer does not synchronize with processing speeds of the stream module and the friend module, thereby resulting in a low speed of processing the follower information of the user having a long relation chain.

SUMMARY

In order to improve a speed of processing follower information of a user having a long relation chain, embodiments of the present invention provide a data processing method and system. The technical solutions are described as follows:

According to one aspect, a data processing method is provided, the method including:

receiving, by a data buffering layer, an operation request of a follower of a user, having a long relation chain, of a client, and pushing the operation request to a service layer;

receiving, by the service layer, the operation request pushed by the data buffering layer, and caching the operation request according to a minimum storage unit, the minimum storage unit being divided by using the user having a long relation chain as a unit; and finding, by the service layer according to a preset routing configuration when data cached in the minimum storage unit reaches a preset condition, a specified database that belongs to the user having a long relation chain, and performing an operation on the specified database according to the operation request.

Further, the pushing the operation request to a service layer includes:

calculating, by the data buffering layer, a minimum operating unit of the user having a long relation chain, and routing the operation request to the minimum operating unit of the service layer.

Further, the receiving, by the service layer, the operation request pushed by the data buffering layer, and caching the operation request according to a minimum storage unit includes:

receiving, by a receiving process at the service layer, the operation request pushed by the data buffering layer, and caching the operation request to the minimum operating unit; and reading, by a storage process at the service layer, the minimum operating unit to obtain the operation request in the minimum operating unit, calculating the minimum storage unit of the operation request, and caching the operation request to the minimum storage unit.

Further, after the receiving, by a receiving process at the service layer, the operation request pushed by the data buffering layer, and caching a log of the operation request to the minimum operating unit, the method further includes:

adding, by the receiving process, one cumulatively to a synchronization sequence number of the minimum operating unit, where the synchronization sequence number is used for identifying a synchronization progress between the receiving process and the data buffering layer.

Further, the reading, by a storage process at the service layer, the minimum operating unit to obtain the operation request in the minimum operating unit includes:

reading, by the storage process, the synchronization sequence number of the minimum operating unit in the receiving process, determining whether the synchronization sequence number of the minimum operating unit is greater than a locally stored reading sequence number of the minimum operating unit, and reading the operation request in the minimum operating unit if the synchronization sequence number is greater than the locally stored reading sequence number, where the reading sequence number is used for identifying a synchronization progress between the storage process and the receiving process.

According to another aspect, a data processing system is provided, the system including: a data buffering layer and a service layer;

the data buffering layer being configured to receive an operation request of a follower of a user, having a long relation chain, of a client, and push the operation request to the service layer;

the service layer being configured to receive the operation request pushed by the data buffering layer, and cache the operation request according to a minimum storage unit, the minimum storage unit being divided by using the user having a long relation chain as a unit; and the service layer being further configured to find, according to a preset routing configuration when data cached in the minimum storage unit reaches a preset condition, a specified database that belongs to the user having a long relation chain, and perform an operation on the specified database according to the operation request.

Further, the data buffering layer is configured to calculate a minimum operating unit of the user having a long relation chain, and route the operation request to the minimum operating unit of the service layer.

Further, the service layer includes a receiving process and a storage process;

the receiving process at the service layer is configured to receive the operation request pushed by the data buffering layer, and cache the operation request to the minimum operating unit; and the storage process at the service layer is configured to read the minimum operating unit to obtain the operation request in the minimum operating unit, calculate the minimum storage unit of the operation request, and cache the operation request to the minimum storage unit.

Further, the receiving process at the service layer is further configured to add one cumulatively to a synchronization sequence number of the minimum operating unit, where the synchronization sequence number is used for identifying a synchronization progress between the receiving process and the data buffering layer.

Further, the storage process at the service layer is configured to: read the synchronization sequence number of the minimum operating unit in the receiving process, determine whether the synchronization sequence number of the minimum operating unit is greater than a locally stored reading sequence number of the minimum operating unit, and read the operation request in the minimum operating unit if the synchronization sequence number is greater than the locally stored reading sequence number, where the reading sequence number is used for identifying a synchronization progress between the storage process and the receiving process.

Beneficial effects of the technical solutions provided in the embodiments of the present invention are: A data buffering layer receives an operation request of a follower of a user, having a long relation chain, of a client, and pushes the operation request to a service layer; the service layer receives the operation request pushed by the data buffering layer, and caches the operation request according to a minimum storage unit; and the service layer finds, according to a preset routing configuration when data cached in the minimum storage unit reaches a preset condition, a specified database that belongs to the user having a long relation chain, and performs an operation on the specified database according to the operation request. The minimum storage unit is divided by using the user having a long relation chain as a unit, so that when the service layer receives the operation request, of the follower, pushed by the data buffering layer, the service layer can store the operation request according to the minimum storage unit, thereby implementing batch operation on an underlying database, reducing a burden of data operation, and improving a speed of processing follower information of the user having a long relation chain.

BRIEF DESCRIPTION OF THE DRAWINGS

To describe the technical solutions of the embodiments of the present invention more clearly, the following briefly introduces the accompanying drawings required for describing the embodiments. Apparently, the accompanying drawings in the following description show only some embodiments of the present invention, and a person of ordinary skill in the art may still derive other drawings from these accompanying drawings without creative efforts.

DESCRIPTION OF EMBODIMENTS

To make the objectives, technical solutions, and advantages of the present disclosure clearer, the embodiments of the present invention are described below in further detail with reference to the accompanying drawings.

Embodiment 1

Figure 1:
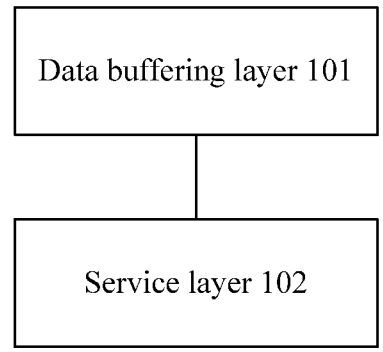
FIG. 1 is a schematic diagram of a data processing system according to Embodiment 1 of the present invention.

Referring to FIG. 1, this embodiment provides a data processing system, and the system includes: a data buffering layer 101 and a service layer 102.

The data buffering layer 101 is configured to receive an operation request of a follower of a user, having a long relation chain, of a client, and push the operation request to the service layer 102.

The service layer 102 is configured to receive the operation request pushed by the data buffering layer 101, and cache the operation request according to a minimum storage unit, where the minimum storage unit is divided by using the user having a long relation chain as a unit.

The service layer 102 is further configured to find, according to a preset routing configuration when data cached in the minimum storage unit reaches a preset condition, a specified database that belongs to the user having a long relation chain, and perform an operation on the specified database according to the operation request.

The data buffering layer 101 is configured to calculate a minimum operating unit of the user having a long relation chain, and route the operation request to the minimum operating unit of the service layer 102.

Figure 2:
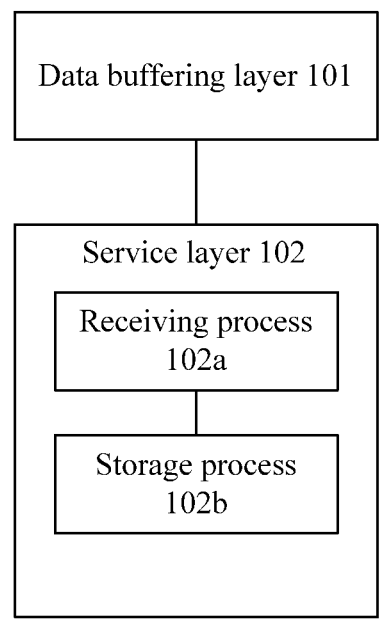
FIG. 2 is a schematic diagram of another data processing system according to Embodiment 1 of the present invention.

Referring to FIG. 2, in this embodiment, the service layer 102 further includes a receiving process 102a and a storage process 102b.

Correspondingly, the receiving process 102a at the service layer 102 is configured to receive the operation request pushed by the data buffering layer 101, and cache the operation request to the minimum operating unit.

The storage process 102b at the service layer 102 is configured to read the minimum operating unit to obtain the operation request in the minimum operating unit, calculate the minimum storage unit of the operation request, and cache the operation request to the minimum storage unit.

Further, the receiving process 102a at the service layer 102 is further configured to add one cumulatively to a synchronization sequence number of the minimum operating unit, where the synchronization sequence number is used for identifying a synchronization progress between the receiving process 102a and the data buffering layer 101.

The storage process 102b at the service layer 102 is configured to: read the synchronization sequence number of the minimum operating unit in the receiving process 102a, determine whether the synchronization sequence number of the minimum operating unit is greater than a locally stored reading sequence number of the minimum operating unit, and read the operation request in the minimum operating unit if the synchronization sequence number is greater than the locally stored reading sequence number, where the reading sequence number is used for identifying a synchronization progress between the storage process 102b and the receiving process 102a.

Beneficial effects of this embodiment are: A data buffering layer receives an operation request of a follower of a user, having a long relation chain, of a client, and pushes the operation request to a service layer; the service layer receives the operation request pushed by the data buffering layer, and caches the operation request according to a minimum storage unit; and the service layer finds, according to a preset routing configuration when data cached in the minimum storage unit reaches a preset condition, a specified database that belongs to the user having a long relation chain, and performs an operation on the specified database according to the operation request. The minimum storage unit is divided by using the user having a long relation chain as a unit, so that when the service layer receives the operation request, of the follower, pushed by the data buffering layer, the service layer can store the operation request according to the minimum storage unit, thereby implementing batch operation on an underlying database, reducing a burden of data operation, and improving a speed of processing follower information of the user having a long relation chain.

Embodiment 2

Figure 3:
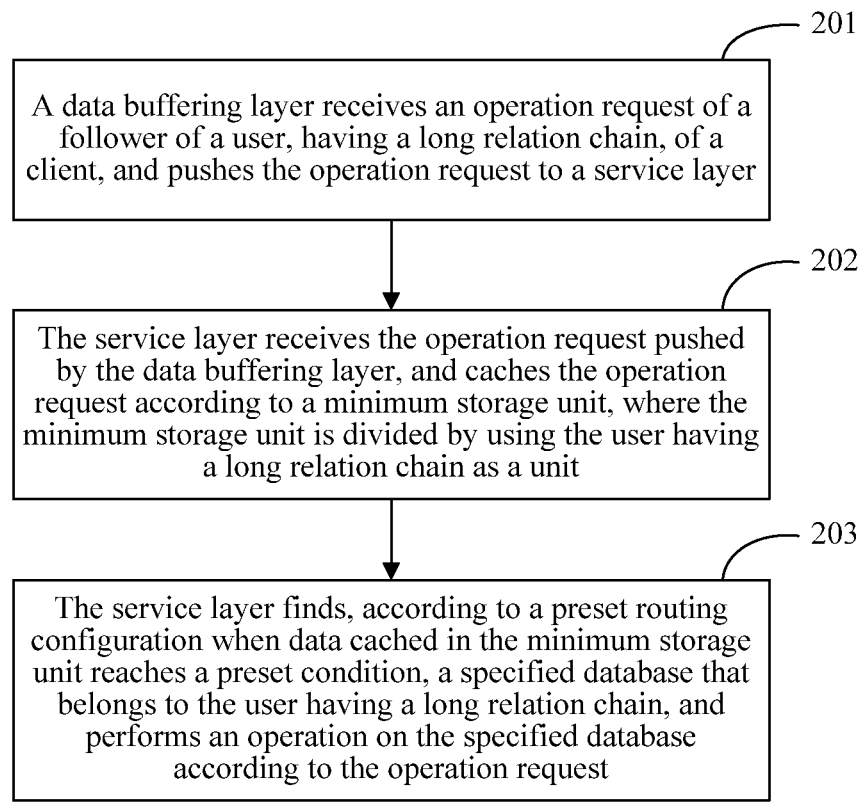
FIG. 3 is a flowchart of a data processing method according to Embodiment 2 of the present invention.

Referring to FIG. 3, based on the data processing system in Embodiment 1, this embodiment provides a data processing method, including:

201: A data buffering layer receives an operation request of a follower of a user, having a long relation chain, of a client, and pushes the operation request to a service layer.

202: The service layer receives the operation request pushed by the data buffering layer, and caches the operation request according to a minimum storage unit, where the minimum storage unit is divided by using the user having a long relation chain as a unit.

203: The service layer finds, according to a preset routing configuration when data cached in the minimum storage unit reaches a preset condition, a specified database that belongs to the user having a long relation chain, and performs an operation on the specified database according to the operation request.

The pushing the operation request to a service layer includes, but is not limited to:

calculating, by the data buffering layer, a minimum operating unit of the user having a long relation chain, and routing the operation request to the minimum operating unit of the service layer.

The receiving, by the service layer, the operation request pushed by the data buffering layer, and caching the operation request according to a minimum storage unit includes, but is not limited to:

receiving, by a receiving process at the service layer, the operation request pushed by the data buffering layer, and caching the operation request to the minimum operating unit; and reading, by a storage process at the service layer, the minimum operating unit to obtain the operation request in the minimum operating unit, calculating the minimum storage unit of the operation request, and caching the operation request to the minimum storage unit.

In this embodiment, after the receiving, by a receiving process at the service layer, the operation request pushed by the data buffering layer, and caching a log of the operation request to the minimum operating unit, the method further includes:

adding, by the receiving process, one cumulatively to a synchronization sequence number of the minimum operating unit, where the synchronization sequence number is used for identifying a synchronization progress between the receiving process and the data buffering layer.

Further, the reading, by a storage process at the service layer, the minimum operating unit to obtain the operation request in the minimum operating unit includes, but is not limited to:

reading, by the storage process, the synchronization sequence number of the minimum operating unit in the receiving process, determining whether the synchronization sequence number of the minimum operating unit is greater than a locally stored reading sequence number of the minimum operating unit, and reading the operation request in the minimum operating unit if the synchronization sequence number is greater than the locally stored reading sequence number, where the reading sequence number is used for identifying a synchronization progress between the storage process and the receiving process.

Beneficial effects of this embodiment are: A data buffering layer receives an operation request of a follower of a user, having a long relation chain, of a client, and pushes the operation request to a service layer; the service layer receives the operation request pushed by the data buffering layer, and caches the operation request according to a minimum storage unit; and the service layer finds, according to a preset routing configuration when data cached in the minimum storage unit reaches a preset condition, a specified database that belongs to the user having a long relation chain, and performs an operation on the specified database according to the operation request. The minimum storage unit is divided by using the user having a long relation chain as a unit, so that when the service layer receives the operation request, of the follower, pushed by the data buffering layer, the service layer can store the operation request according to the minimum storage unit, thereby implementing batch operation on an underlying database, reducing a burden of data operation, and improving a speed of processing follower information of the user having a long relation chain.

Embodiment 3

Figure 4:
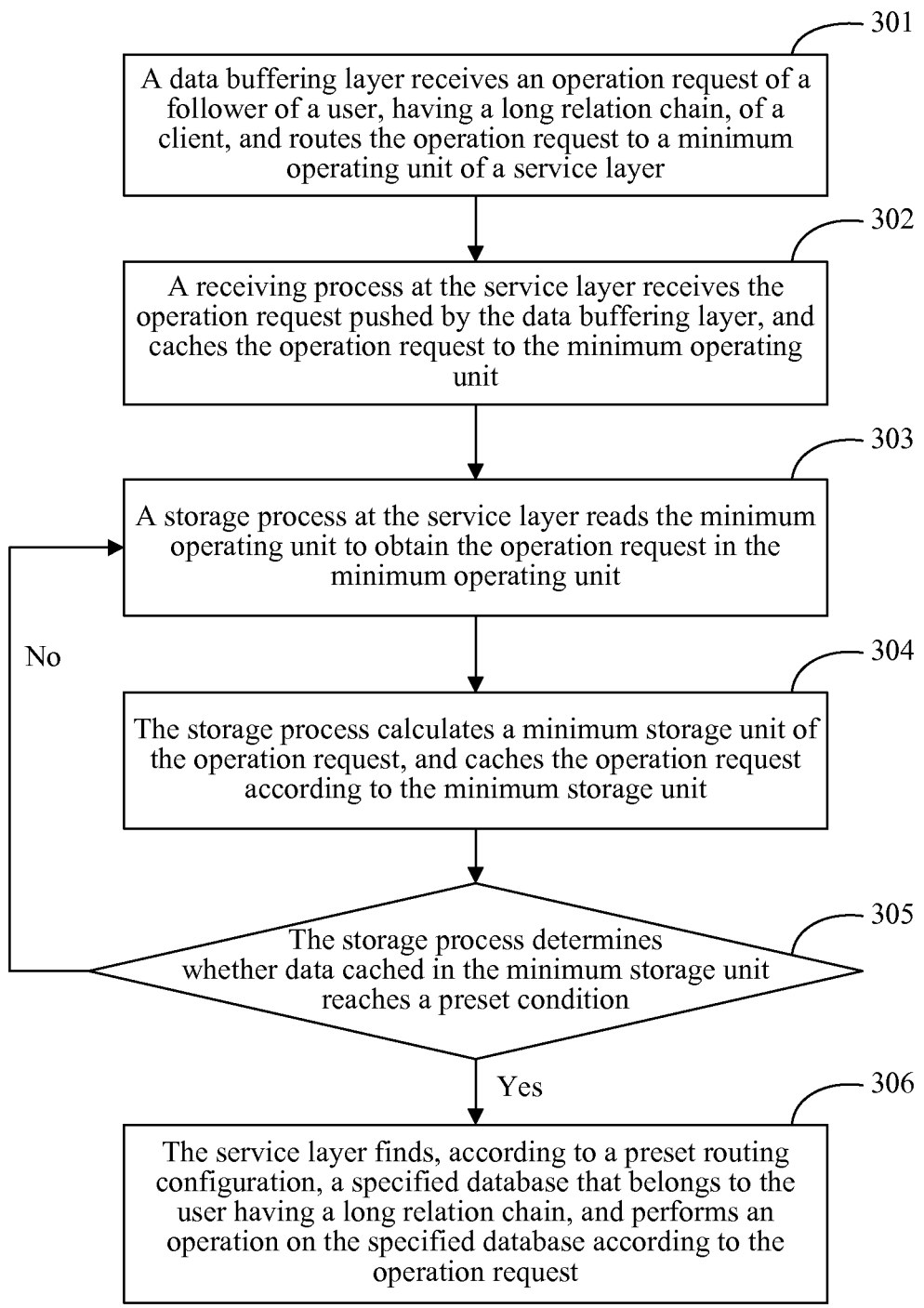
FIG. 4 is a flowchart of a data processing method according to Embodiment 3 of the present invention.

Referring to FIG. 4, based on the data processing system in Embodiment 1, this embodiment of the present invention provides a data processing method, and a process of the method includes:

301: A data buffering layer receives an operation request of a follower of a user, having a long relation chain, of a client, and pushes the operation request to a service layer.

In this step, the pushing, by the data buffering layer, the operation request to a service layer includes, but is not limited to:

calculating, by the data buffering layer, a minimum operating unit of the user having a long relation chain, and routing the operation request to the minimum operating unit.

Besides the foregoing manner of pushing the operation request to the service layer, another pushing manner may also be used, which is not specifically limited in this embodiment.

In this embodiment, the service layer is divided into a receiving process and a storage process, and a cache in the receiving process is divided into multiple minimum operating units. The minimum operating units are obtained by a Uin module 4999 of the user having a long relation chain. A Uin includes an account of the user, and the like, and is not specifically limited in this embodiment.

After receiving the operation request of the follower of the user, having a long relation chain, of the client, the data buffering layer calculates the minimum operating unit of the user having a long relation chain. A specific calculation method is using the Uin module 4999 of the user having a long relation chain. The operation request is routed to the service layer according to the minimum operating unit of the user having a long relation chain. The operation request of the follower of the user having a long relation chain includes: an adding request, a deleting request, a message forwarding request, a request for commenting a message, or the like, and is not specifically limited in this embodiment.

302: A receiving process at the service layer receives the operation request pushed by the data buffering layer, and caches the operation request to a minimum operating unit.

In this step, the receiving process caches the received operation request to the minimum operating unit according to a routing destination address of the data buffering layer. The operation request is used for recording follower operation information of the user having a long relation chain. For example, it is recorded that a user x having a long relation chain adds a follower a, a user y having a long relation chain adds a follower b, the user x having a long relation chain deletes a follower c, or the like.

In this embodiment, the receiving process stores a synchronization sequence number for each minimum operating unit in the cache. The synchronization sequence number is used for identifying a synchronization progress between the receiving process and the data buffering layer. After receiving one operation request, the receiving process adds one cumulatively to a synchronization sequence number of a minimum operating unit that caches the operation request. For example, the receiving process has multiple minimum operating units and stores the received operation request of the user to a third minimum operating unit. Then, after the operation request is stored to the third minimum operating unit, one is added cumulatively to a synchronization sequence number of the third minimum operating unit. In this step, after the operation request is stored to the minimum operating unit, one is added cumulatively to a synchronization sequence number of the minimum operating unit. For example, an original synchronization sequence number is 5, and after one is added cumulatively to the original synchronization sequence number, the synchronization sequence number is 6.

303: A storage process at the service layer reads the minimum operating unit to obtain the operation request in the minimum operating unit.

In this embodiment, corresponding to the synchronization sequence number stored for each minimum operating unit by the receiving process, the storage process stores a corresponding reading sequence number for each minimum operating unit. The reading sequence number is used for identifying a synchronization progress between the storage process and the receiving process, that is, a synchronization progress between an operation request in each minimum operating unit read by the storage process and one received by the receiving process. The storage process determines whether there is a new synchronization operation request in a minimum operating unit by comparing the reading sequence number and the synchronization sequence number, so as to read the new operation request in time.

In this step, the reading, by a storage process at the service layer, the minimum operating unit to obtain the operation request in the minimum operating unit specifically includes:

reading, by the storage process, the synchronization sequence number of the minimum operating unit in the receiving process, determining whether the synchronization sequence number of the minimum operating unit is greater than a locally stored reading sequence number of the minimum operating unit, and reading the operation request in the minimum operating unit if the synchronization sequence number is greater than the locally stored reading sequence number.

304: The storage process calculates a minimum storage unit of the operation request, and caches the operation request according to the minimum storage unit.

In this embodiment, a minimum data storage unit is re-divided by using the user having a long relation chain as a unit, so that one user having a long relation chain corresponds to one database. In this way, when performing data processing, the storage process only needs to perform an operation on a minimum operating unit rather than on data of all users having a long relation chain, thereby reducing a burden of data operation.

It should be noted that, when the number of followers of a user having a long relation chain exceeds a preset number, follower information of the user having a long relation chain may be divided further, so that one minimum operating unit only includes some follower information of the user having a long relation chain. The preset number may be set in advance according to an empirical value, may also be adjusted according to current running efficiency of a system, and is not specifically limited in this embodiment.

In this embodiment, the calculating, by the storage process, a minimum storage unit of the operation request includes, but is not limited to: obtaining the minimum storage unit of the operation request according to a Uin of the user having a long relation chain, a Uin of a follower and a configured number of minimum storage units of the user having a long relation chain. A specific representation form is: the Uin of the user having a long relation chain_Uin % of fans of the configured number of minimum storage units. For example, the Uin of the user having a long relation chain is configured to Ser. No. 12/345,678, and 9 minimum storage units are configured for the user having a long relation chain, and then the configured minimum storage units are Ser. No. 12/345,678_0, 12345678_1, . . . , and 12345678_8.

In this step, after the minimum storage unit of the operation request is calculated, the operation request is cached according to the minimum storage unit, that is, the operation request is cached to the minimum storage unit.

Steps 302 to 304 are a specific operating process of receiving, by the service layer, the operation request pushed by the data buffering layer, and caching the operation request according to the minimum storage unit.

305: The storage process determines whether data cached in the minimum storage unit reaches a preset condition. If yes, perform step 306, or otherwise, go back to perform step 303.

In this embodiment, the storage process regularly scans each minimum storage unit. When detecting that a minimum storage unit reaches a storage condition, the storage process routes operation data in the minimum storage unit to a corresponding database for storage. In this embodiment, when scanning the minimum storage unit in step 304, the storage process determines whether data cached in the minimum storage unit reaches a preset condition, and performs a storage operation on the data in the minimum storage unit if the data cached in the minimum storage unit reaches the preset condition.

The preset condition, that is, the storage condition, may be set in advance according to an empirical value, may also be adjusted in real time according to a current running situation of a system, and is not specifically limited in this embodiment.

306: The service layer finds, according to a preset routing configuration, a specified database that belongs to the user having a long relation chain, and performs an operation on the specified database according to the operation request.

In this embodiment, multiple databases are set, and routing configuration is performed in advance according to a rule of the Uin module 4999 of the user having a long relation chain. The service layer finds, according to the preset routing configuration, a specified database that belongs to the user having a long relation chain, and performs an operation on the specified database according to the operation request. For example, if the operation request is a friend adding request, a data adding operation is performed in the database; if the operation request is a deleting request, a data deleting operation is performed in the database.

Beneficial effects of this embodiment are: A data buffering layer receives an operation request of a follower of a user, having a long relation chain, of a client, and pushes the operation request to a service layer; the service layer receives the operation request pushed by the data buffering layer, and caches the operation request according to a minimum storage unit; and the service layer finds, according to a preset routing configuration when data cached in the minimum storage unit reaches a preset condition, a specified database that belongs to the user having a long relation chain, and performs an operation on the specified database according to the operation request. The minimum storage unit is divided by using the user having a long relation chain as a unit, so that when the service layer receives the operation request, of the follower, pushed by the data buffering layer, the service layer can store the operation request according to the minimum storage unit, thereby implementing batch operation on an underlying database, reducing a burden of data operation, and improving a speed of processing follower information of the user having a long relation chain. Moreover, by means of routing configuration of databases, operation requests are stored to different databases, so that follower information of a user separates at a database level, thereby further reducing an operation burden of a server and improving performance of a system. Moreover, the minimum operating unit is also used as a unit for caching in a receiving process of the service layer, which further reduces an operation burden of the service layer and improves a speed of data processing.

Embodiment 4

Figure 5:
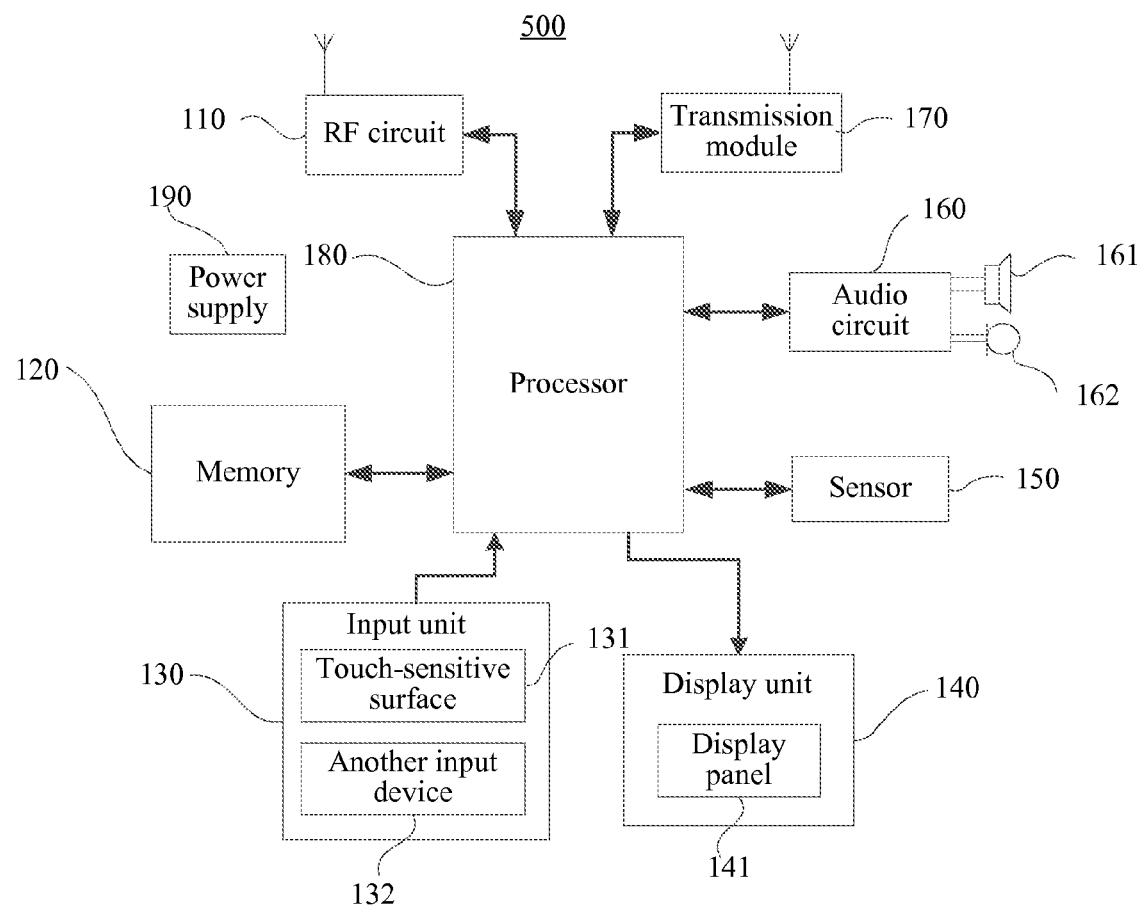
FIG. 5 is a schematic structural diagram of a terminal according to Embodiment 4 of the present invention.

Referring to FIG. 5, this embodiment of the present invention provides a schematic structural diagram of a terminal, which is a schematic diagram of a structure, having a touch-sensitive surface, involved in this embodiment of the present invention. The terminal can be configured to implement the data processing method provided in the foregoing embodiments. Specifically:

The terminal 500 may include components such as a radio frequency (RF) circuit 110, a memory 120 including one or more computer readable storage media, an input unit 130, a display unit 140, a sensor 150, an audio circuit 160, a transmission module 170, a processor 180 including one or more processing cores, and a power supply 190. A person skilled in the art may understand that the structure of the terminal shown in FIG. 5 does not constitute a limitation to the terminal, and the terminal may include more components or fewer components than those shown in the figure, or some components may be combined, or a different component deployment may be used.

The RF circuit 110 may be configured to receive and send signals during an information receiving and sending process or a call process. Specifically, after receiving downlink information from a base station, the RF circuit 110 delivers the downlink information to one or more processors 180 for processing, and sends related uplink data to the base station. Generally, the RF circuit 110 includes, but is not limited to, an antenna, at least one amplifier, a tuner, one or more oscillators, a subscriber identity module (SIM) card, a transceiver, a coupler, a low noise amplifier (LNA), and a duplexer. In addition, the RF circuit 110 may also communicate with a network and another device by wireless communication. The wireless communication may use any communications standard or protocol, which includes, but is not limited to, Global System for Mobile communications (GSM), a General Packet Radio Service (GPRS), Code Division Multiple Access (CDMA), Wideband Code Division Multiple Access (WCDMA), Long Term Evolution (LTE), e-mail, Short Messaging Service (SMS), and the like.

The memory 120 may be configured to store a software program and module, such as a software program and module corresponding to an apparatus for improving a running speed of an application program in Embodiment 3. The processor 180 runs the software program and module stored in the memory 120, to implement various functional applications and data processing, such as implement improvement of a running speed of an application program. The memory 120 may mainly include a program storage area and a data storage area. The program storage area may store an operating system, an application program required by at least one function (such as a sound playback function and an image display function), and the like. The data storage area may store data (such as audio data and an address book) created according to use of the terminal 500, and the like. In addition, the memory 120 may include a high speed random access memory, and may also include a non-volatile memory, such as at least one magnetic disk storage device, a flash memory, or another volatile solid-state storage device. Accordingly, the memory 120 may further include a memory controller, so that the processor 180 and the input unit 130 access the memory 120.

The input unit 130 may be configured to receive input digit or character information, and generate keyboard, mouse, joystick, optical, or track ball signal input related to the user setting and function control. Specifically, the input unit 130 may include a touch-sensitive surface 131 and another input device 132. The touch-sensitive surface 131 may also be referred to as a touch screen or a touch panel, and may collect a touch operation of a user on or near the touch-sensitive surface (such as an operation of a user on or near the touch-sensitive surface 131 by using any suitable object or attachment, such as a finger or a touch pen), and drive a corresponding connection apparatus according to a preset program. Optionally, the touch-sensitive surface 131 may include two parts: a touch detection apparatus and a touch controller. The touch detection apparatus detects a touch position of the user, detects a signal generated by the touch operation, and transfers the signal to the touch controller. The touch controller receives the touch information from the touch detection apparatus, converts the touch information into touch point coordinates, and sends the touch point coordinates to the processor 180. Moreover, the touch controller can receive and execute a command sent from the processor 180. In addition, the touch-sensitive surface 131 may be implemented by using various types, such as a resistive type, a capacitance type, an infrared type, and a surface acoustic wave type. In addition to the touch-sensitive surface 131, the input unit 130 may further include the another input device 132. Specifically, the another input device 132 may include, but is not limited to, one or more of a physical keyboard, a functional key (such as a volume control key or a switch key), a track ball, a mouse, and a joystick.

The display unit 140 may be configured to display information input by the user or information provided for the user, and various graphical user interfaces of the terminal 500. The graphical user interfaces may be formed by a graph, a text, an icon, a video, and any combination thereof. The display unit 140 may include a display panel 141. Optionally, the display panel 141 may be configured by using a liquid crystal display (LCD), an organic light-emitting diode (OLED), or the like. Further, the touch-sensitive surface 131 may cover the display panel 141. After detecting a touch operation on or near the touch-sensitive surface 131, the touch-sensitive surface 131 transfers the touch operation to the processor 180, so as to determine a type of a touch event. Then, the processor 180 provides corresponding visual output on the display panel 141 according to the type of the touch event. Although, in FIG. 5, the touch-sensitive surface 131 and the display panel 141 are used as two separate parts to implement input and output functions, in some embodiments, the touch-sensitive surface 131 and the display panel 141 may be integrated to implement the input and output functions.

The terminal 500 may further include at least one sensor 150, such as an optical sensor, a motion sensor, and other sensors. Specifically, the optical sensor may include an ambient light sensor and a proximity sensor. The ambient light sensor may adjust luminance of the display panel 141 according to brightness of the ambient light. The proximity sensor may switch off the display panel 141 and/or backlight when the terminal 500 is moved to the ear. As one type of motion sensor, a gravity acceleration sensor may detect magnitude of accelerations in various directions (generally on three axes), may detect magnitude and a direction of the gravity when static, and may be applied to an application that recognizes the attitude of the mobile phone (for example, switching between landscape orientation and portrait orientation, a related game, and magnetometer attitude calibration), a function related to vibration recognition (such as a pedometer and a knock). Other sensors, such as a gyroscope, a barometer, a hygrometer, a thermometer, and an infrared sensor, which may be configured in the terminal 500 are not further described herein.

The audio circuit 160, a loudspeaker 161, and a microphone 162 may provide audio interfaces between the user and the terminal 500. The audio circuit 160 may convert received audio data into an electric signal and transmit the electric signal to the loudspeaker 161. The loudspeaker 161 converts the electric signal into a sound signal for output. On the other hand, the microphone 162 converts a collected sound signal into an electric signal. The audio circuit 160 receives the electric signal and converts the electric signal into audio data, and outputs the audio data to the processor 180 for processing. Then, the processor 180 sends the audio data to, for example, another terminal by using the RF circuit 110, or outputs the audio data to the memory 120 for further processing. The audio circuit 160 may further include an earplug jack, so as to provide communication between a peripheral earphone and the terminal 500.

The terminal 500 may help, by using the transmission module 170, a user to receive and send an e-mail, browse a webpage, and access stream media, and the like, which provides wireless or wired broadband Internet access for the user. Although FIG. 5 shows the transmission module 170, it may be understood that, the transmission module is not a necessary component of the terminal 500, and when required, the transmission module may be omitted as long as the scope of the essence of the present disclosure is not changed.

The processor 180 is a control center of the terminal 500, and connects to various parts of the mobile phone by using various interfaces and lines. By running or executing the software program and/or module stored in the memory 120, and invoking data stored in the memory 120, the processor 180 performs various functions and data processing of the terminal 500, thereby performing overall monitoring on the mobile phone. Optionally, the processor 180 may include one or more processing cores. Preferably, the processor 180 may integrate an application processor and a modem. The application processor mainly processes an operating system, a user interface, an application program, and the like. The modem mainly processes wireless communication. It may be understood that, the foregoing modem may also not be integrated into the processor 180.

The terminal 500 further includes the power supply 190 (such as a battery) for supplying power to the components. Preferably, the power supply may logically connect to the processor 180 by using a power supply management system, thereby implementing functions, such as charging, discharging, and power consumption management, by using the power supply management system. The power supply 190 may further include any component, such as one or more direct current or alternate current power supplies, a re-charging system, a power supply fault detection circuit, a power supply converter or an inverter, and a power supply state indicator.

Although not shown in the figure, the terminal 500 may further include a camera, a Bluetooth module, and the like, which are not further described herein. Specifically, in this embodiment, the display unit of the terminal is a touch screen display, and the terminal further includes a memory and one or more programs. The one or more programs are stored in the memory and configured to be executed by one or more processors. The one or more programs contain an instruction used for implementing the following operations:

receiving, by a data buffering layer, an operation request of a follower of a user, having a long relation chain, of a client, and pushing the operation request to a service layer;

receiving, by the service layer, the operation request pushed by the data buffering layer, and caching the operation request according to a minimum storage unit, where the minimum storage unit is divided by using the user having a long relation chain as a unit; and finding, by the service layer according to a preset routing configuration when data cached in the minimum storage unit reaches a preset condition, a specified database that belongs to the user having a long relation chain, and performing an operation on the specified database according to the operation request.

Assuming that the above is a first possible implementation manner, in a second possible implementation manner that is provided on the basis of the first possible implementation manner, the memory of the terminal further includes an instruction used for implementing the following operations:

calculating, by the data buffering layer, a minimum operating unit of the user having a long relation chain, and routing the operation request to the minimum operating unit of the service layer.

In a third possible implementation manner that is provided on the basis of the second possible implementation manner, the memory of the terminal further includes an instruction used for implementing the following operations:

receiving, by a receiving process at the service layer, the operation request pushed by the data buffering layer, and caching the operation request to the minimum operating unit; and reading, by a storage process at the service layer, the minimum operating unit to obtain the operation request in the minimum operating unit, calculating the minimum storage unit of the operation request, and caching the operation request to the minimum storage unit.

In a fourth possible implementation manner that is provided on the basis of the third possible implementation manner, the memory of the terminal further includes an instruction used for implementing the following operation:

adding, by the receiving process, one cumulatively to a synchronization sequence number of the minimum operating unit, where the synchronization sequence number is used for identifying a synchronization progress between the receiving process and the data buffering layer.

In a fifth possible implementation manner that is provided on the basis of the fourth possible implementation manner, the memory of the terminal further includes an instruction used for implementing the following operations:

reading, by the storage process, the synchronization sequence number of the minimum operating unit in the receiving process, determining whether the synchronization sequence number of the minimum operating unit is greater than a locally stored reading sequence number of the minimum operating unit, and reading the operation request in the minimum operating unit if the synchronization sequence number is greater than the locally stored reading sequence number, where the reading sequence number is used for identifying a synchronization progress between the storage process and the receiving process.

In conclusion, beneficial effects of this embodiment are: A data buffering layer receives an operation request of a follower of a user, having a long relation chain, of a client, and pushes the operation request to a service layer; the service layer receives the operation request pushed by the data buffering layer, and caches the operation request according to a minimum storage unit; and the service layer finds, according to a preset routing configuration when data cached in the minimum storage unit reaches a preset condition, a specified database that belongs to the user having a long relation chain, and performs an operation on the specified database according to the operation request. The minimum storage unit is divided by using the user having a long relation chain as a unit, so that when the service layer receives the operation request, of the follower, pushed by the data buffering layer, the service layer can store the operation request according to the minimum storage unit, thereby implementing batch operation on an underlying database, reducing a burden of data operation, and improving a speed of processing follower information of the user having a long relation chain. Moreover, by means of routing configuration of databases, operation requests are stored to different databases, so that follower information of a user separates at a database level, thereby further reducing an operation burden of a server and improving performance of a system. Moreover, the minimum operating unit is also used as a unit for caching in a receiving process of the service layer, which further reduces an operation burden of the service layer and improves a speed of data processing.

Embodiment 5

This embodiment of the present invention provides a computer readable storage medium. The computer readable storage medium may be the computer readable storage medium included in the memory in the above embodiment, and may also exist independently as a computer readable storage medium that is not assembled into a terminal. The computer readable storage medium stores one or more programs, and the one or more programs are used for executing a data processing method by one or more processors. The method includes:

receiving, by a data buffering layer, an operation request of a follower of a user, having a long relation chain, of a client, and pushing the operation request to a service layer;

receiving, by the service layer, the operation request pushed by the data buffering layer, and caching the operation request according to a minimum storage unit, where the minimum storage unit is divided by using the user having a long relation chain as a unit; and finding, by the service layer according to a preset routing configuration when data cached in the minimum storage unit reaches a preset condition, a specified database that belongs to the user having a long relation chain, and performing an operation on the specified database according to the operation request.

Assuming that the above is a first possible implementation manner, in a second possible implementation manner that is provided on the basis of the first possible implementation manner, the pushing the operation request to a service layer includes:

calculating, by the data buffering layer, a minimum operating unit of the user having a long relation chain, and routing the operation request to the minimum operating unit of the service layer.

In a third possible implementation manner that is provided on the basis of the second possible implementation manner, the receiving, by the service layer, the operation request pushed by the data buffering layer, and caching the operation request according to a minimum storage unit includes:

receiving, by a receiving process at the service layer, the operation request pushed by the data buffering layer, and caching the operation request to the minimum operating unit; and reading, by a storage process at the service layer, the minimum operating unit to obtain the operation request in the minimum operating unit, calculating the minimum storage unit of the operation request, and caching the operation request to the minimum storage unit.

In a fourth possible implementation manner that is provided on the basis of the third possible implementation manner, after the receiving, by a receiving process at the service layer, the operation request pushed by the data buffering layer, and caching a log of the operation request to the minimum operating unit, the method further includes:

adding, by the receiving process, one cumulatively to a synchronization sequence number of the minimum operating unit, where the synchronization sequence number is used for identifying a synchronization progress between the receiving process and the data buffering layer.

In a fifth possible implementation manner that is provided on the basis of the fourth possible implementation manner, the reading, by a storage process at the service layer, the minimum operating unit to obtain the operation request in the minimum operating unit includes:

reading, by the storage process, the synchronization sequence number of the minimum operating unit in the receiving process, determining whether the synchronization sequence number of the minimum operating unit is greater than a locally stored reading sequence number of the minimum operating unit, and reading the operation request in the minimum operating unit if the synchronization sequence number is greater than the locally stored reading sequence number, where the reading sequence number is used for identifying a synchronization progress between the storage process and the receiving process.

Beneficial effects of this embodiment are: A data buffering layer receives an operation request of a follower of a user, having a long relation chain, of a client, and pushes the operation request to a service layer; the service layer receives the operation request pushed by the data buffering layer, and caches the operation request according to a minimum storage unit; and the service layer finds, according to a preset routing configuration when data cached in the minimum storage unit reaches a preset condition, a specified database that belongs to the user having a long relation chain, and performs an operation on the specified database according to the operation request. The minimum storage unit is divided by using the user having a long relation chain as a unit, so that when the service layer receives the operation request, of the follower, pushed by the data buffering layer, the service layer can store the operation request according to the minimum storage unit, thereby implementing batch operation on an underlying database, reducing a burden of data operation, and improving a speed of processing follower information of the user having a long relation chain. Moreover, by means of routing configuration of databases, operation requests are stored to different databases, so that follower information of a user separates at a database level, thereby further reducing an operation burden of a server and improving performance of a system. Moreover, the minimum operating unit is also used as a unit for caching in a receiving process of the service layer, which further reduces an operation burden of the service layer and improves a speed of data processing.

Embodiment 6

This embodiment of the present invention provides a graphical user interface. The graphical user interface is used on a terminal. The terminal includes a touch screen display, a memory, and one or more processors used for executing one or more programs. The graphical user interface includes:

receiving, by a data buffering layer, on the touch screen display, an operation request of a follower of a user, having a long relation chain, of a client, and pushing the operation request to a service layer;

receiving, by the service layer, the operation request pushed by the data buffering layer, and caching the operation request according to a minimum storage unit, where the minimum storage unit is divided by using the user having a long relation chain as a unit; and finding, by the service layer according to a preset routing configuration when data cached in the minimum storage unit reaches a preset condition, a specified database that belongs to the user having a long relation chain, and performing an operation on the specified database according to the operation request.

Beneficial effects of this embodiment are: A data buffering layer receives an operation request of a follower of a user, having a long relation chain, of a client, and pushes the operation request to a service layer; the service layer receives the operation request pushed by the data buffering layer, and caches the operation request according to a minimum storage unit; and the service layer finds, according to a preset routing configuration when data cached in the minimum storage unit reaches a preset condition, a specified database that belongs to the user having a long relation chain, and performs an operation on the specified database according to the operation request. The minimum storage unit is divided by using the user having a long relation chain as a unit, so that when the service layer receives the operation request, of the follower, pushed by the data buffering layer, the service layer can store the operation request according to the minimum storage unit, thereby implementing batch operation on an underlying database, reducing a burden of data operation, and improving a speed of processing follower information of the user having a long relation chain. Moreover, by means of routing configuration of databases, operation requests are stored to different databases, so that follower information of a user separates at a database level, thereby further reducing an operation burden of a server and improving performance of a system. Moreover, the minimum operating unit is also used as a unit for caching in a receiving process of the service layer, which further reduces an operation burden of the service layer and improves a speed of data processing.

It should be noted that: the data processing system provided in the foregoing embodiments is merely described by using division of the functional modules as an example. In an actual application, the foregoing functions may be allocated to be completed by different functional modules according to needs, that is, an internal structure of the system is divided into different functional modules to complete all or some of the functions described above.

In addition, the data processing system provided in the foregoing embodiments and the embodiments of the data processing method belong to a same idea. Refer to the method embodiments for a specific implementation process of the data processing system, which is not further described herein.

The foregoing sequence numbers of the embodiments of the present invention are merely used for description, and do not represent preference among the embodiments.

A person of ordinary skill in the art may understand that all or some of the steps of the foregoing embodiments may be implemented by using hardware, or may be implemented by a program instructing relevant hardware. The program may be stored in a computer readable storage medium. The storage medium mentioned above may be a read-only memory, a magnetic disk, an optical disc, or the like.

The foregoing descriptions are merely preferred embodiments of the present invention, but are not intended to limit the present disclosure. Any modification, equivalent replacement, or improvement made within the spirit and principle of the present disclosure shall fall within the protection scope of the present disclosure.

What is claimed is:

1. A data processing method, the method comprising:
    receiving, by a data buffering layer, an operation request of a follower of a user, having a long relation chain, of a client, and pushing the operation request to a service layer;
    receiving, by the service layer, the operation request pushed by the data buffering layer, and caching the operation request according to a minimum storage unit, the minimum storage unit being divided by using the user having a long relation chain as a unit; and
    finding, by the service layer according to a preset routing configuration when data cached in the minimum storage unit reaches a preset condition, a specified database that belongs to the user having a long relation chain, and performing an operation on the specified database according to the operation request;

wherein the pushing the operation request to a service layer comprises:

calculating, by the data buffering layer, a minimum operating unit of the user having a long relation chain, and routing the operation request to the minimum operating unit of the service layer;

wherein the receiving, by the service layer, the operation request pushed by the data buffering layer, and caching the operation request according to a minimum storage unit comprises:

receiving, by a receiving process at the service layer, the operation request pushed by the data buffering layer, and caching a log of the operation request to the minimum operating unit; and reading, by a storage process at the service layer, the minimum operating unit to obtain the operation request in the minimum operating unit, calculating the minimum storage unit of the operation request, and caching the operation request to the minimum storage unit.

2. The method according to claim 1, wherein after the receiving, by a receiving process at the service layer, the operation request pushed by the data buffering layer, and caching a log of the operation request to the minimum operating unit, the method further comprises:

adding, by the receiving process, one cumulatively to a synchronization sequence number of the minimum operating unit, wherein the synchronization sequence number is used for identifying a synchronization progress between the receiving process and the data buffering layer.

3. The method according to claim 2, wherein the reading, by a storage process at the service layer, the minimum operating unit to obtain the operation request in the minimum operating unit comprises:

reading, by the storage process, the synchronization sequence number of the minimum operating unit in the receiving process, determining whether the synchronization sequence number of the minimum operating unit is greater than a locally stored reading sequence number of the minimum operating unit, and reading the operation request in the minimum operating unit if the synchronization sequence number is greater than the locally stored reading sequence number, wherein the reading sequence number is used for identifying a synchronization progress between the storage process and the receiving process.

4. A terminal, the terminal comprising: a touch screen display, one or more processors, a memory, and one or more programs, the one or more programs being stored in the memory and configured to be executed by the one or more processors, and the one or more programs containing an instruction used for performing the following operations:

receiving, by a data buffering layer, an operation request of a follower of a user, having a long relation chain, of a client, and pushing the operation request to a service layer;

receiving, by the service layer, the operation request pushed by the data buffering layer, and caching the operation request according to a minimum storage unit, the minimum storage unit being divided by using the user having a long relation chain as a unit; and finding, by the service layer according to a preset routing configuration when data cached in the minimum storage unit reaches a preset condition, a specified database that belongs to the user having a long relation chain, and performing an operation on the specified database according to the operation request; the terminal comprising an instruction used for performing the following operations:

calculating, by the data buffering layer, a minimum operating unit of the user having a long relation chain, and routing the operation request to the minimum operating unit of the service layer;

the terminal comprising an instruction used for performing the following operations:

receiving, by a receiving process at the service layer, the operation request pushed by the data buffering layer, and caching a log of the operation request to the minimum operating unit; and reading, by a storage process at the service layer, the minimum operating unit to obtain the operation request in the minimum operating unit, calculating the minimum storage unit of the operation request, and caching the operation request to the minimum storage unit.

5. The terminal according to claim 4, comprising an instruction used for performing the following operation:

adding, by the receiving process, one cumulatively to a synchronization sequence number of the minimum operating unit, wherein the synchronization sequence number is used for identifying a synchronization progress between the receiving process and the data buffering layer.

6. The terminal according to claim 5, comprising an instruction used for performing the following operations:

reading, by the storage process, the synchronization sequence number of the minimum operating unit in the receiving process, determining whether the synchronization sequence number of the minimum operating unit is greater than a locally stored reading sequence number of the minimum operating unit, and reading the operation request in the minimum operating unit if the synchronization sequence number is greater than the locally stored reading sequence number, wherein the reading sequence number is used for identifying a synchronization progress between the storage process and the receiving process.

7. A non-transitory computer readable storage medium, the computer readable storage medium storing one or more programs, the one or more programs being used for executing a data processing method by one or more processors, and the method comprising:

receiving, by a data buffering layer, an operation request of a follower of a user, having a long relation chain, of a client, and pushing the operation request to a service layer;

receiving, by the service layer, the operation request pushed by the data buffering layer, and caching the operation request according to a minimum storage unit, the minimum storage unit being divided by using the user having a long relation chain as a unit; and finding, by the service layer according to a preset routing configuration when data cached in the minimum storage unit reaches a preset condition, a specified database that belongs to the user having a long relation chain, and performing an operation on the specified database according to the operation request;

wherein the pushing the operation request to a service layer comprises:

calculating, by the data buffering layer, a minimum operating unit of the user having a long relation chain, and routing the operation request to the minimum operating unit of the service layer;

wherein the receiving, by the service layer, the operation request pushed by the data buffering layer, and caching the operation request according to a minimum storage unit comprises:

receiving, by a receiving process at the service layer, the operation request pushed by the data buffering layer, and caching a log of the operation request to the minimum operating unit; and reading, by a storage process at the service layer, the minimum operating unit to obtain the operation request in the minimum operating unit, calculating the minimum storage unit of the operation request, and caching the operation request to the minimum storage unit.

8. The non-transitory computer readable storage medium according to claim 7, wherein after the receiving, by a receiving process at the service layer, the operation request pushed by the data buffering layer, and caching a log of the operation request to the minimum operating unit, the method further comprises:

adding, by the receiving process, one cumulatively to a synchronization sequence number of the minimum operating unit, wherein the synchronization sequence number is used for identifying a synchronization progress between the receiving process and the data buffering layer.

9. The non-transitory computer readable storage medium according to claim 8, wherein the reading, by a storage process at the service layer, the minimum operating unit to obtain the operation request in the minimum operating unit comprises:

reading, by the storage process, the synchronization sequence number of the minimum operating unit in the receiving process, determining whether the synchronization sequence number of the minimum operating unit is greater than a locally stored reading sequence number of the minimum operating unit, and reading the operation request in the minimum operating unit if the synchronization sequence number is greater than the locally stored reading sequence number, wherein the reading sequence number is used for identifying a synchronization progress between the storage process and the receiving process.

* * * * *